US010669677B2

(12) United States Patent
Wiktor et al.

(10) Patent No.: US 10,669,677 B2
(45) Date of Patent: Jun. 2, 2020

(54) HYDRAULIC SYSTEM FOR DRIVING A VIBRATORY MECHANISM

(71) Applicant: VOLVO CONSTRUCTION EQUIPMENT AB, Eskilstuna (SE)

(72) Inventors: Roland Wiktor, Hameln (DE); Erik Gustaf Lilljebjörn, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 204 days.

(21) Appl. No.: 15/103,859

(22) PCT Filed: Dec. 16, 2013

(86) PCT No.: PCT/SE2013/000196
§ 371 (c)(1),
(2) Date: Jun. 11, 2016

(87) PCT Pub. No.: WO2015/094023
PCT Pub. Date: Jun. 25, 2015

(65) Prior Publication Data

US 2016/0319496 A1 Nov. 3, 2016

(51) Int. Cl.
*F15B 1/02* (2006.01)
*E01C 19/28* (2006.01)
(Continued)

(52) U.S. Cl.
CPC .............. *E01C 19/286* (2013.01); *F15B 1/04* (2013.01); *F15B 11/17* (2013.01); *F15B 21/02* (2013.01);
(Continued)

(58) Field of Classification Search
CPC ................ F15B 1/024; F15B 2211/265; F15B 2211/2654
See application file for complete search history.

(56) References Cited

U.S. PATENT DOCUMENTS 3,972,187 A 8/1976 Ital et al.
5,410,879 A 5/1995 Houze
(Continued)

FOREIGN PATENT DOCUMENTS

CN 2514033 Y 10/2002
CN 2880896 Y 3/2007
(Continued)

OTHER PUBLICATIONS

Chinese Official Action (dated May 4, 2017) for corresponding Chinese App. 2103800816827.
(Continued)

*Primary Examiner* — F Daniel Lopez
(74) *Attorney, Agent, or Firm* — Sage Patent Group

(57) ABSTRACT

A hydraulic system for driving a vibratory mechanism of a compaction roller includes at least one hydraulic motor connectable to a vibratory mechanism and a first hydraulic pump fluidly connected to the at least one hydraulic motor and arranged for supplying pressurised hydraulic fluid to the at least one hydraulic motor. The hydraulic system further includes a second hydraulic pump fluidly connected to the at least one hydraulic motor and arranged for supplying pressurised hydraulic fluid to the at least one hydraulic motor. A corresponding method for controlling a vibratory mechanism of a compaction roller is also provided.

16 Claims, 8 Drawing Sheets

(51) Int. Cl.
*F15B 1/04* (2006.01)
*F15B 11/17* (2006.01)
*F15B 21/02* (2006.01)

(52) U.S. Cl.
CPC ............ *E01C 19/28* (2013.01); *E01C 19/282* (2013.01); *F15B 1/024* (2013.01); *F15B 2211/20538* (2013.01); *F15B 2211/20546* (2013.01); *F15B 2211/20576* (2013.01); *F15B 2211/2654* (2013.01); *F15B 2211/75* (2013.01)

(56) References Cited

U.S. PATENT DOCUMENTS

| | | | | |
|---|---|---|---|---|
| 6,971,463 | B2 * | 12/2005 | Shore | B60K 6/12 180/165 |
| 9,169,604 | B2 | 10/2015 | Pieske et al. | |
| 2002/0172556 | A1 | 11/2002 | Staffenhagen et al. | |
| 2003/0082003 | A1 | 5/2003 | Potts | |
| 2011/0314801 | A1 * | 12/2011 | Baltes | B60K 6/12 60/416 |
| 2013/0025385 | A1 | 1/2013 | Renz et al. | |

FOREIGN PATENT DOCUMENTS

| | | | |
|---|---|---|---|
| CN | 102383360 | A | 3/2012 |
| DE | 2555716 | A1 | 6/1977 |
| DE | 3409566 | A1 | 9/1985 |

OTHER PUBLICATIONS

International Search Report (dated Sep. 25, 2014) for corresponding International App. PCT/SE2013/000196.
International Preliminary Report on Patentabiliy (dated Feb. 10, 2016) for corresponding International App. PCT/SE2013/000196.
European Official Action (dated Mar. 8, 2013) for corresponding European App. EP 13 89 9395.
European Official Action (dated Apr. 20, 2018) for corresponding European App. EP 13 89 9395.

* cited by examiner

HYDRAULIC SYSTEM FOR DRIVING A VIBRATORY MECHANISM

BACKGROUND AND SUMMARY

This disclosure relates to a hydraulic system for driving a vibratory mechanism of a compaction roller. The hydraulic system comprising at least one hydraulic motor connectable to vibratory mechanism and a hydraulic pump fluidly connected to the at least one hydraulic motor and arranged for supplying pressurised hydraulic fluid to the at least one hydraulic motor. The disclosure also relates to a corresponding method for controlling a vibrator mechanism of a compaction roller. The hydraulic system may be installed on a compaction machine comprising a single, dual or more compaction rollers.

Compaction machines are used for compacting the ground on construction work sites to accomplish a smooth and flat ground surface, in particular in earthwork and road construction. The ground surface may comprise soil, gravel, asphalt and the like. The compaction machine comprises at least one substantially cylindrical compaction roller that presses the soil flat. The compaction machine relies partly on its static mass and partly on a dynamic compacting force to generate a high compacting force at the contact surface between the compaction roller and soil surface. The dynamic compacting force is generated by operating a vibratory mechanism associated with the at least one compaction roller. The vibratory mechanism comprises at least one weight that is eccentrically offset from a rolling axis of the compaction roller, and upon rotation of the weight by means of vibration drive a centrifugal force is generated due to the eccentricity and a relatively high inertia, thereby producing the dynamic compacting force.

Compaction machines on the job site typically drive forward and backward in a sequence of for example 30 seconds. During each change of direction the vibration drive is preferably switched off for avoiding detrimental effects on the compacted surface. The eccentric mass has high inertia which is accelerated and decelerated each time the machine reverses the direction of travel. To avoid interference with natural frequencies of the structure of the machine and to improve the productivity, the vibration drive need to be accelerated and stopped quickly, preferably in less than 10 seconds and more preferably in less than 5 seconds. The vibration drive is typically of hydrostatic nature. The needed torque to accelerate the inertia is inverse proportional to the launch time. Therefore the power of the eccentrics' hydraulic pumps and motors is designed for this start/stop activity. During the steady run the needed torque (rotary power) is typically significantly less than half of the start-up torque.

In traditional hydraulic systems for vibration drives comprising a fixed displacement pump a relatively large amount of energy is lost in throttling; losses caused by the difference in supplied flow by the pump and consumed flow by the motor. The flow difference, which gradually decreases with increased motor speed, is guided back to the tank via a pressure relief valve. Document WO2011095200 describes a solution for reducing the level of energy losses without necessarily compromising on acceleration level. This solution comprises a hydraulic accumulator and valve assembly for storing the kinetic energy of the eccentrics during the deceleration and for reusing the energy to accelerate them again. There is however still room for improvements with respect to fuel efficiency and cost-efficiency of the compaction machine.

It is desirable to provide a hydraulic system that provides improved fuel efficiency of the eccentric drives and enables use of as power source having less maximal output power while maintaining a quick acceleration phase of the eccentric drive.

The disclosure concerns, according to a first aspect, a hydraulic system for driving a vibratory mechanism of a compaction roller, wherein the hydraulic system comprising at least one hydraulic motor connectable to vibratory mechanism and a first hydraulic pump fluidly connected to the at least one hydraulic motor and arranged for supplying pressurised hydraulic fluid to the at least one hydraulic motor.

The disclosure, according to the first aspect, is characterized in that the hydraulic system further comprises a second hydraulic pump fluidly connected to the at least one hydraulic motor and arranged for supplying pressurised hydraulic fluid to the at least one hydraulic motor.

In conventional hydraulic systems for driving a vibratory system a power source, typically a diesel engine drives a single fixed displacement hydraulic pump for delivering hydraulic fluid to a hydraulic motor via a control valve assembly. Relief pressure valves provide a safe and proper operation of the hydraulic system by eliminating excessive and potentially damaging pressure build-up in the hydraulic system. The single fixed displacement pump has to have sufficient flow capacity to accelerate the hydraulic motor and the associated vibratory mechanism to a nominal speed. During the acceleration period of the vibratory mechanism the single fixed displacement hydraulic pump constantly delivers high flow volumes. Due to the constant flow of the pump approximately half of this energy will be dissipated at the pressure relief valves, because the hydraulic motor at the eccentrics speed up continuously and the flow through the hydraulic pump increases from zero to full pump flow. The pressure relief valve, which influences the acceleration level of the hydraulic motor, is selected to avoid any damages of the hydraulic system due to excessive pressure. The single fixed displacement pump system will consequently require a relatively high power output from the engine during the complete acceleration time.

The hydraulic system according to a first aspect comprises a first and a second hydraulic pump fluidly connected to the at least one hydraulic motor and both are arranged for supplying pressurised hydraulic fluid to the hydraulic motor. This arrangement enables, by proper dimensioning and operation of the first and second hydraulic pumps, improved fuel efficiency of the eccentric drives while maintaining a quick acceleration phase of the eccentric drive. These advantageous aspects may for example be realised by supplying pressurised hydraulic fluid to the at least one hydraulic motor from only one of the first and second hydraulic pumps during a first part of a hydraulic motor acceleration phase, and to supply pressurised hydraulic fluid to the at least one hydraulic motor from both of the first and second hydraulic pumps during a second part of the hydraulic motor acceleration phase. This arrangement has the advantage that each hydraulic pump may exhibit a smaller displacement compared with the displacement of the single fixed displacement pump according to the conventional solution. Operation of a smaller displacement pump requires less engine power than operation of a larger displacement pump at the same engine speed during the acceleration phase because less flow, i.e. energy will be dissipated at the pressure relief valve. After a certain time period of operation of a single hydraulic pump also the second hydraulic pump is operated. The combined displacement of the first and second hydraulic pumps may be selected to correspond to the displacement of the conventional single pump design, such that the hydraulic motor may be accelerated to the desired speed.

According to farther aspect of the disclosure, the hydraulic, system further may comprise a hydraulic accumulator fluidly connected to the at least one hydraulic motor.

Thereby at least part of the kinetic energy of the eccentric can during deceleration thereof be converted to hydraulic energy and temporarily stored in the hydraulic accumulator, and upon later acceleration of the eccentric the stored hydraulic energy can be used to accelerate the eccentric. Use of the accumulator enables significant reduction or even a complete elimination of dissipation of energy at the relief valve, thereby reducing overall fuel consumption.

According to yet a further aspect of the disclosure, one of the first and second hydraulic pumps has a larger maximal displacement volume than the other of the first and second hydraulic pump. The two pumps in sum guaranty that the nominal speed of the hydraulic motor is achieved. The recovered amount of rotary energy of the eccentrics is always less than the energy needed to accelerate the eccentrics to the same speed again due to normal unavoidable energy losses associated with the energy conversion and friction in bearings etc. However, the required additional energy in form of additional fluid flow is relatively small since the energy loss is relatively small. If the additional energy is supplied after completed discharge of the accumulator the total fluid flow that must be supplied by the first and second pumps is relatively large since it corresponds to the flow at nominal motor speed. The supply pressure must also be relatively high to provide the required acceleration level. The current engine torque input equals current pump supply pressure times current total pump supply flow. Hence, the engine must be able to provide a relatively large peak output power during this short period to accelerate the hydraulic motor up to the nominal speed. Also the components of the power train, especially the engine and the pump need to be designed for this peak power.

However, if the additional fluid flow from the smaller pump is provided concurrently with the flow from the accumulator the deliver flow level must merely correspond to said energy loss occasioned by said energy conversion associated with the hydraulic accumulator during deceleration/acceleration. Consequently, by having a smaller displacement pump and a larger displacement pump, and by operating only the smaller displacement pump during the acceleration phase, i.e. as an acceleration pump, and by operating the larger displacement pump only upon having reached the nominal motor speed, i.e. a steady-state mode, the engine peak power can be significantly reduced. The smaller pump may be also be designed as a high pressure pump capable of deliver flow at the high pressure needed for sufficient acceleration level of the eccentrics. The larger pump however may be designed to deliver only the steady state pressure level of the running eccentrics, which pressure level is significantly lower than the acceleration pressure. The larger pump may thus be manufactured in less durable material and with lower demands with respect to tolerances, such that the cost of the larger pump may be reduced. Furthermore, because the swept volume of the smaller pump is relatively small, even at high pressure the required torque output from the engine shaft is relatively small. Due to the reduced requirement of peak power the installed engine size can be reduced with the effect of better fuel efficiency and easier installation in the machine. Furthermore, this solution also enables variability in the frequency of the vibration by operating the smaller and larger pumps together or by operating only the larger pump of the hydraulic system. Operation of only the larger pump provides a lower frequency mode and by operating both pumps simultaneously a higher frequency mode is provided, all without the need for any additional components for providing the two different vibration frequencies.

Once the eccentrics achieved their nominal speed the larger pump can be connected too. The smaller displacement pump of the first and second hydraulic pump has a displacement volume in the range of 10%-90% of the larger displacement pump, preferably in the range of 20%-70%, and more preferably in the range of 25%-50%. The actual relative size of the first and second pumps will be determined based on the actual system design including in particular the amount of energy conversion losses.

The disclosure also concerns a method for controlling a vibratory mechanism of a compaction roller according to the first aspect. The vibratory mechanism is mechanically connected to at least one hydraulic motor arranged to be supplied with pressurised hydraulic fluid from a first and a second hydraulic pump. The method comprising steps of accelerating the hydraulic motor by supplying pressurised hydraulic fluid to the at least one hydraulic motor from only one of the first and second hydraulic pumps during a first part of a hydraulic, motor acceleration phase, and accelerating the hydraulic motor by supplying pressurised hydraulic fluid to the at least one hydraulic motor from both of the first and second hydraulic pumps during a second part of the hydraulic motor acceleration phase. This method will exhibit advantages corresponding to the hydraulic system of the first aspect described above. A smaller and a larger hydraulic pump enable use of a more cost-efficient and simple components to reduce the energy consumption of the vibratory drive of a compaction machine and allow significant reduction in engine peak torque requirement. Also, the smaller displacement pump may be designed to withstand a higher operating, pressure than the larger hydraulic pump because the larger displacement pump may be arranged to be operated first upon having reached the nominal motor speed. At a stage where the acceleration phase associated with the smaller displacement pump has terminated and the steady-state has been reached, a less complex and less costly pump is considered sufficient.

Further advantages are achieved by implementing one or several of the features of the dependent claims.

According to a further aspect of the disclosure, one of the first and second hydraulic pumps is a variable displacement pump and the other of the first and second hydraulic pumps is a fixed displacement pump. This layout enables an infinite variability of the frequency in a certain range if needed for optimizing the compaction result with respect to the environmental material. It is beneficial to replace only the smaller displacement pump by a variable displacement pump and to keep the larger displacement pump for the basic steady state flow. The potential combination of high flow at low pressure and small variable flow at high pressure with these two pumps allow a low-cost variable frequency drive.

The disclosure further relates to a compaction machine comprising such a hydraulic system, a computer program comprising program code means for performing the steps of the described method, a computer readable medium carrying a computer program comprising program code means for performing the steps of the described method when said program product is run on a computer, and a control unit for controlling the described hydraulic system.

BRIEF DESCRIPTION OF DRAWINGS

In the detailed description below reference is made to the following figure, in which.

DETAILED DESCRIPTION

Various aspects of the disclosure will hereinafter be described in con junction with the appended drawings to illustrate and not to limit, the disclosure, wherein like designations denote like elements, and variations of the described aspects are not restricted to the specifically shown embodiment, but are applicable on other variations of the disclosure.

Vibratory steel rollers and drums exert forces which increase compaction effort. Vibratory rollers have internal eccentric weights that rotate on a shaft. The rotating eccentric weight causes the roller to move in all directions but the effective part is the up and down movement. Vibratory forces are the rapid up and down movements which cause aggregates and soil particles to move. Aggregates in motion tend to re-orient themselves easier so the material compacts easier under the weight of the roller. Vibration is a particularly effective tool for the aggregate or particulate material like sand, gravel and asphalt. A relatively large compaction machine typically comprises a frame, a front compaction roller and a rear compaction roller rotatably connected to the frame. The machine may further comprise a motor for rotationally driving an assembly for vibrating the compaction machine, and in particular for vibrating the front and/or rear compaction roller. The machine may have a static weight of about 10 000 kg, such that each roller exerts a static weight of about 5000 kg. In addition to the static weight, each vibratory roller may exert a dynamic weight of about 12 000 kg merely caused by the centrifugal forces generated by an eccentric rotating assembly positioned within each vibratory compaction roller. Hence, to total effective compacting weight may typically add up to about 17 000 kg. This example, clearly shows the advantage of providing the compaction roller with a rotating vibratory assembly.

Figure 1:
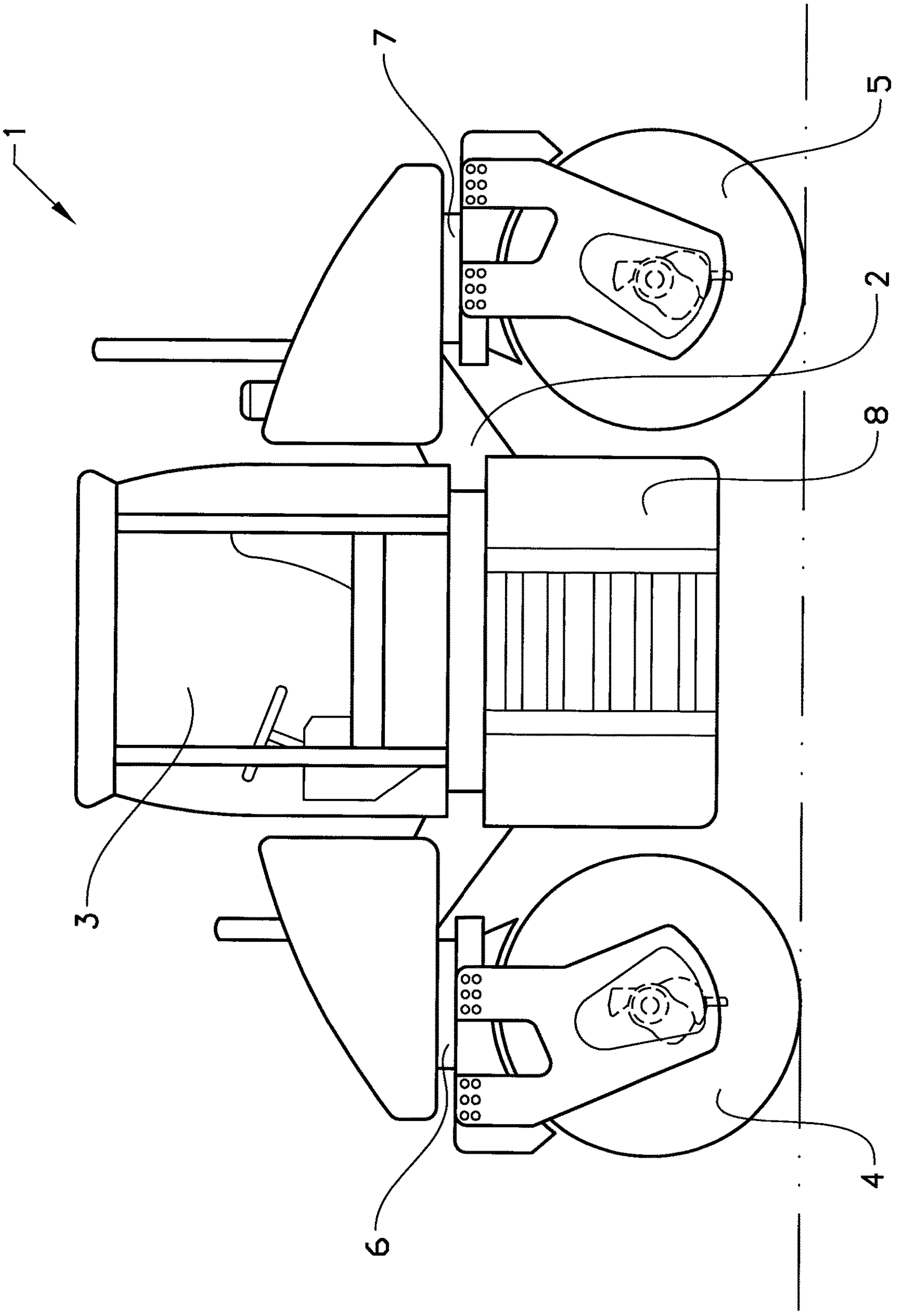
FIG. 1 shows an exemplary compaction machine having on which the hydraulic system for driving a vibratory mechanism according to the disclosure may be implemented.

FIG. 1 shows a tandem compaction machine 1 that comprises a frame 2 with driver's cab 3, a front compaction roller 4 and a rear compaction roller 5 each being mounted via a steerable swivel coupling 6, 7 at the front and rear underneath said frame 2 respectively. Situated between the two compaction rollers 4, 5 is an engine compartment 8 which houses a drive engine, usually a diesel engine. The disclosed compaction machine comprises two compaction rollers and a driver's cabin but this disclosure should be understood as merely an exemplary machine in which the hydraulic system and method according to the disclosure may suitable be implemented. The hydraulic system and method according to the disclosure may be equally implemented in any type of compaction machines having at least one compaction roller, such as compaction machines that are pulled or pushed by other objects, such as a tractor or a human operator.

Figure 2:
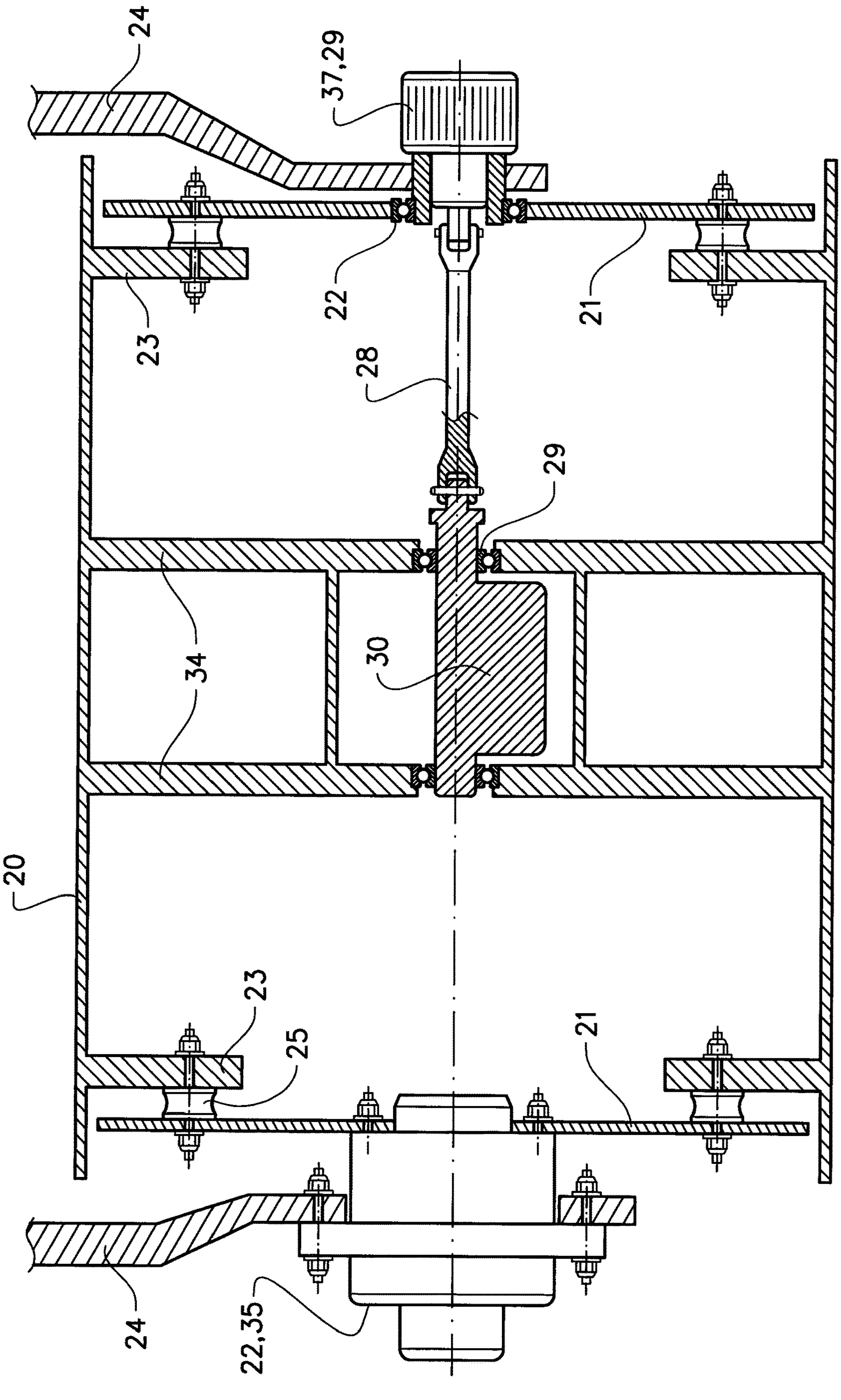
FIG. 2 shows an exemplary compaction roller of the machine in FIG. 1.

FIG. 2 shows a schematic and simplified cross-sectional view of an exemplary compaction roller 4, 5. The compaction roller 4, 5 comprises a cylindrical wall 20 that contacts the ground. The cylindrical wall 20 is connected to structural support plates 23 and rotatable mounted by means of two outer radially extending plates 21. The radially extending plates 21 are mounted to the structural support plates 23 via vibration damping elements 25, such as rubber-metal elements. A motor 35, such as hydraulic motor or hydraulic motor combined with a gearbox, is fastened to a frame support member 24 to drive the compaction roller 4, 5 of the compaction machine 1. Bearings 22 are integrated into motor 35 and radially extending plate 21 to allow rotation of the radially extending plates 21 and the cylindrical wall 20 relative to frame support 24 to drive the compaction machine 1. Situated in the centre of the compaction roller 4, 5 is an eccentric 30, which is rotatably supported within the roller 4, 5, by rolling bearings 29. The eccentric comprises a rotational axis and a centre of mass that is radially offset from the rotational axis, such that the eccentric 30 upon rotation generates rotating centrifugal force vector that is directed radially outwardly from the rotational axis. The eccentric is here depicted as a single piece and with a constant mass centre offset. However, the disclosure is equally applicable to eccentrics having variable mass centre offset, which offset for example is varied as a function of the rotational direction of the eccentric and/or the rotational speed of the eccentric 30. The eccentric 30 is driven by a hydraulic motor 37 via a driving shaft 28, which is connected by means of articulated joints at both ends for allowing the compaction roller 4, 5 to vibrate with a certain amplitude and frequency. Two inner radially extending support plates 34 extending from the inner surface of the cylindrical wall 20 carries the bearings 29 and transfer vibrations generated by the eccentric 30 to the cylindrical wall 20.

Figure 3:
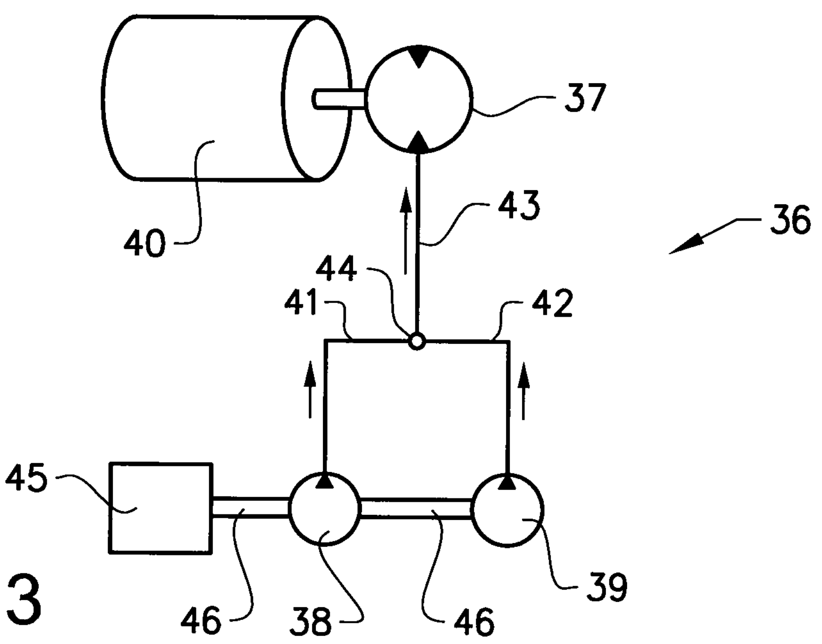
FIG. 3 shows a schematic version of a first embodiment of the disclosure.

FIG. 3 shows very schematically the hydraulic system 36 for driving a vibratory mechanism 40 of the compaction roller according to a first embodiment of the disclosure. The vibratory mechanism 40 typically comprises at least one eccentric 30 and optionally also driving shaft 28. The hydraulic system 36 comprising a hydraulic motor 37 connected to vibratory mechanism 40. The hydraulic, system 36 further comprises a first and a second hydraulic pump 38, 39 fluidly connected to the at least one hydraulic motor 37 and arranged for supplying pressurised hydraulic fluid to the hydraulic motor 37 via fluid feed paths 41 42, 43. The first and second hydraulic pumps 38, 39 are fluidly connected to the hydraulic motor 37 partly via first and second individual feed paths 41 42, and partly via a common feed path 43. The first and second individual feed paths 41 42 meet and merge to the common feed path 43 at a coupling point 44.

A single power source 45, such as a combustion engine or electrical motor is rotationally connected to the first and second hydraulic pumps 38, 39 via a mechanical transmission arrangement 46 for driving said pumps 38, 39. The mechanical transmission arrangement 46 is merely schematically depicted in the figures of the disclosure and may comprise means (not showed), such as one or more clutches, fix selectively connecting only the first pump 38, only the second pump 39 or both pumps 38, 39 to the power source. An individual power source for powering each hydraulic pump individually may of course alternatively be used.

The hydraulic system 36 is preferably formed as an open circuit system, wherein the first and second pumps 38, 39 are arranged to draw hydraulic fluid from one or more tanks (not showed) storing hydraulic fluid at substantially atmospheric pressure, and wherein fluid exiting the hydraulic motor 37 is guided back to said tank. The hydraulic system 36 may however alternatively be formed as a closed circuit system, wherein the hydraulic fluid exiting the hydraulic motor 37 is guided back to a fluid inlet port of the first and second hydraulic pumps 38, 39. The general layout of an open circuit system and a closed circuit system are known in the prior art and FIG. 1 and FIG. 3 and corresponding text in document W02011095200 is cited as a reference hereto.

Figure 4:
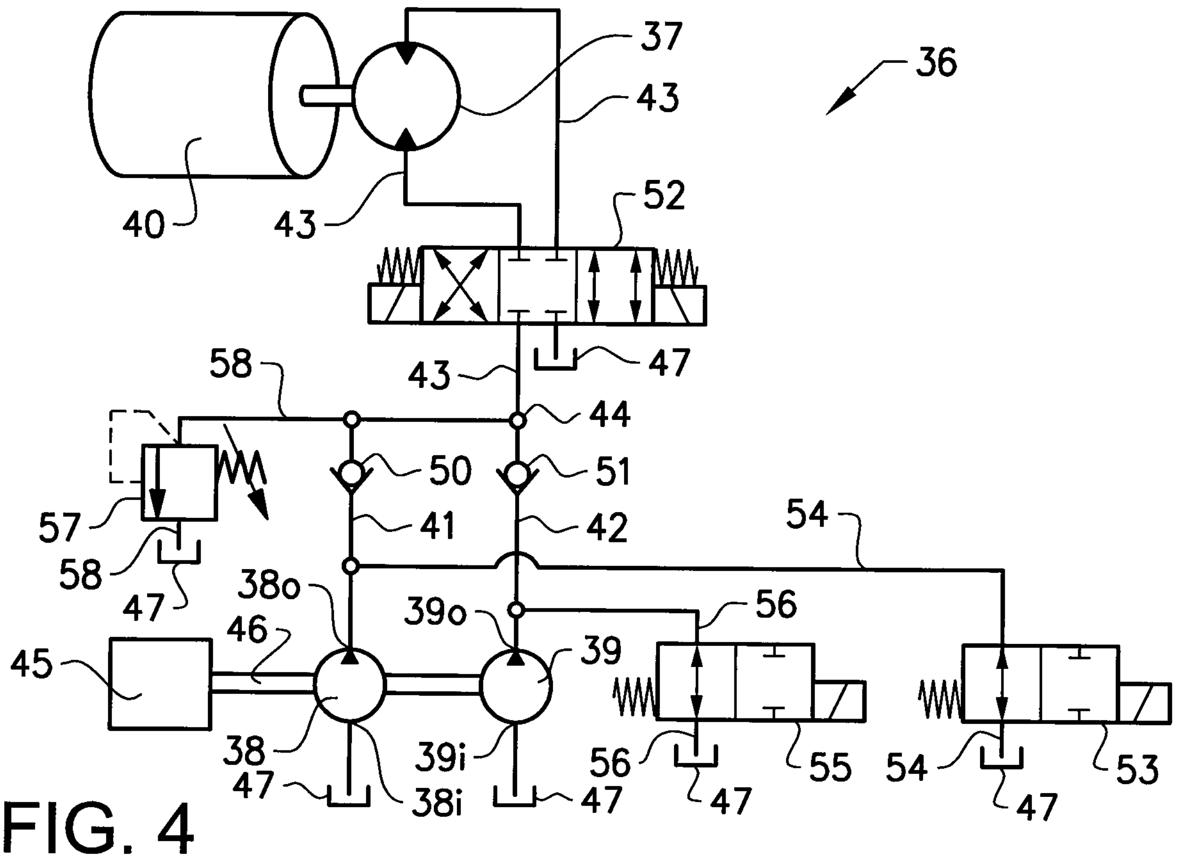
FIG. 4 shows a more detailed version of the first embodiment.

In FIG. 4 an exemplary layout of the hydraulic system 36 according to the first embodiment is shown more in detail. The hydraulic system 36 is here illustrated as an open circuit layout having first and second fixed displacement pumps 38, 39. The first and seconds pumps may have substantially the same fixed displacement volume, or different fixed displacement volume. The inlet ports 38*i*, 39*i* of the first and second hydraulic, pumps 38, 39 are fluidly connected to a tank 47. Similar to FIG. 3, the power source 45 drives the first and second pumps 38, 39 via the mechanical transmission arrangement 46. Outlet ports 38*o*, 39*o* of the pumps 38, 39 are fluidly connected to a fluid port of the hydraulic motor 37 partly via individual fluid feed paths 41, 42, and partly via a common feed path 43.

A first check valve 50 is provided in the first feed path 41 and connected with its inlet to the outlet port 38*o* of the first pump 38, such that fluid flow from the first pump 38 to the hydraulic motor 37 is allowed but fluid flow in the opposite direction is prevented. A second check valve 51 is provided in the second feed path 42 and connected with its inlet to the outlet port 39*o* of the second pump 39, such that fluid flow from the second pump 39 to the hydraulic motor 37 is allowed but fluid flow in the opposite direction is prevented. Moreover, since each check valve 50, 51 is arranged upstream of the coupling point 44 where the first and second individual feed paths 41 42 meet and merge, fluid flow from the first pump 38 to the second pump 39 and oppositely is prevented.

A motor control valve 52 is arranged in the common feed path 43 for controlling operation of the hydraulic motor 37. The motor control valve 52 is here illustrated as normally closed electrically controlled directional control valve having three positions and four ports. Both flow to and from the hydraulic motor 37 thus flows through the motor control valve 52. This motor control valve 52 enables operation of the hydraulic motor 37 in both directions, which may be advantageous if the eccentric 30 exhibits different eccentricity in different rotational directions. The closed centre of the motor control valve 52 also ensures that the hydraulic motor does not receive any flow in that control position. As an alternative to the disclosed motor control valve 52 a more simple valve device may be provided upstream or downstream of the hydraulic motor 37, wherein flow exiting the hydraulic motor flows to the tank 47.

The mechanical transmission arrangement 46 as shown in FIG. 4 lacks an means for disconnecting the single power source 45 from the first and second pumps 38, 39, which consequently constantly provides a fluid flow when the torque is supplied to the hydraulic pumps 38, 39 from the power source 45. A first control valve 53 is positioned in a first return path 54 that connects the tank 47 with the first feed path 41 upstream the first check valve 50. Similarly, a second control valve 55 is positioned in a second return path 56 that connects the tank 47 with the second feed path 42 upstream the second check valve 50. Both the first and second control valves are here depicted as normally open electrically controlled directional control valve but other variants are possibly. Moreover, a pressure relief valve 57 is located in a third return path 58 that connects the tank 47 with the first and second feed paths 41, 42 downstream the first and second check valves 50, 51 respectively. The pressure relief valve, which serves to protect the components of the hydraulic system from excessive pressure, is normally set relatively high, for example about 50-400 bar, preferably about 100-300 bar.

Figure 5A:
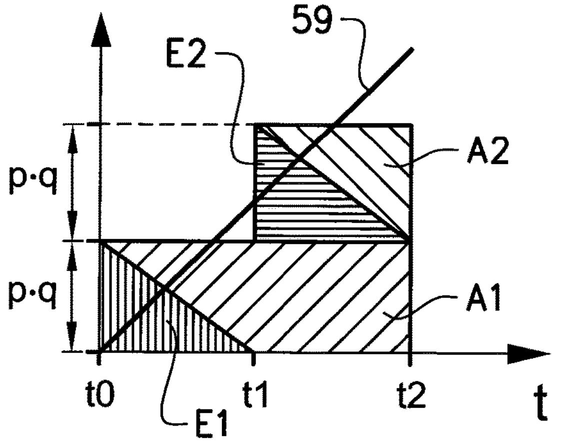
FIG. 5*a* shows a diagram illustrating the advantage of the teaching of the disclosure.

Operation of the hydraulic system 36 of FIG. 4 will now be described with reference to FIG. 5*a* that illustrates the reduced level of energy losses accomplished during acceleration of the eccentric 30 from stillstand to nominal speed by means of the teaching of the disclosure. The first and second hydraulic pumps 38, 39 have in this example the same displacement volume. Time interval to-t1 corresponds to a first acceleration phase, and time interval t1-12 corresponds to a second acceleration phase. Before time tO the speed 59 of the hydraulic motor 37 is zero, the power source drives the first and second pumps 38, 39 at a predetermined constant speed to deliver constant and equal flow rate q (volume/time) at substantially zero feed pressure p because the first and second control valves 53, 55 are open. The motor control valve 52 is in closed position preventing any flow from reaching the motor 37. At time tO the first control valve 53 closes the first return path 54 and the motor control valve 52 is set to enable flow from the common feed path 43 to the hydraulic motor 37. The power source is dimensioned to keep substantially as constant output speed, and the first fixed displacement pump 38 delivers hydraulic flow with an energy level proportional to the feed pressure p times feed flow q. At time tO substantially all flow from the first pump is passes through the pressure relief valve 57 because the hydraulic motor 37 is at stillstand. Consequently, at time tO the power loss corresponds to p x q. The feed pressure p is considered constant and the hydraulic motor 37 will consequently accelerate with constant value up to time point t1 when the flow through the hydraulic motor 37 equals the flow through the first pump 38. Because the motor consumes increased flow from zero to q during the time between tO and t1, half of the supplied power is dissipated and lost in the pressure relief valve 57. This energy loss is illustrated as hatched triangle area E1 and corresponds to (t1-t0)×(p×q)/2. The accumulated flow volume from the first pump 38 through the motor corresponds to the area A1.

Figure 5B:
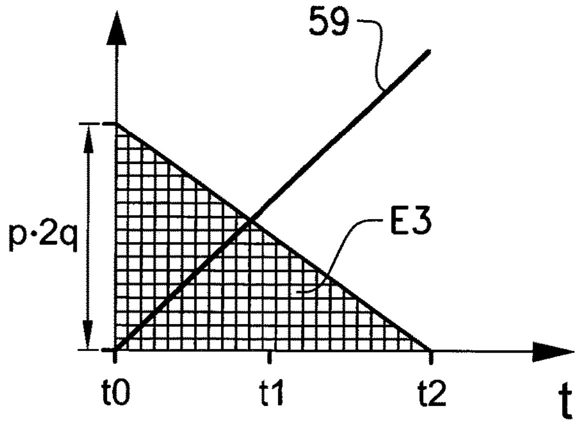
FIG. 5*b* shows a diagram illustrating the performance of the prior art solution.

At time t1 the second control valve 55 closes the second return path 54. Motor control valve 52 and first control valve 53 remains unchanged in their previous positions. As a result, the second fixed displacement pump 39 delivers hydraulic flow with an energy level proportional to the feed pressure p times feed flow q. At time t1 substantially all flow from the second pump passes through the pressure relief valve 57 and the power loss at time ti thus corresponds to p×q. The hydraulic motor 37 will continue accelerating, with constant value up to time point t2 when the flow through the hydraulic motor 37 equals the combined flow through the first and second pumps 38, 39. Half of the supplied power from the second pump 39 is dissipated and lost in the pressure relief valve 57. This energy loss is illustrated as hatched triangle area E2 and corresponds to (t2-t1)×(p×q)/2. The accumulated flow volume from the second pump 39 through the motor corresponds to the area A2. The total level of energy loss E1+E2 must be compared with a situation where a single hydraulic, pump is arranged to drive the hydraulic motor. The energy loss for such an arrangement is illustrated in FIG. 5*b*, where the energy loss is illustrated as hatched triangle area E3 and corresponds to (t2-tO)×(p×2*q*)/2. The hydraulic system 36 according to FIG. 4 consequently enables a reduction in energy loss by half when two equally sized pumps are used instead of a single pump.

Worth noting is also the fact that the dual pump embodiment of FIG. 4 also enables a reduction of the time period in which peak power is required from the power source. The power source of the duel pump hydraulic system corresponding to FIG. 5*a* must in the time period of tO-11 merely deliver a peak power corresponding to the flow q times the feed pressure p, and in the time period of t1-t2 deliver a peak power corresponding to the double flow 2q times the feed pressure p. The peak power of the power source is thus required only during half of the acceleration phase. In the single pump embodiment corresponding to FIG. 5*b* however, the power source must operate at peak power during the complete time interval tO-12, because the pump output is constant 2q and the feed pressure p is also constant.

Figure 6:
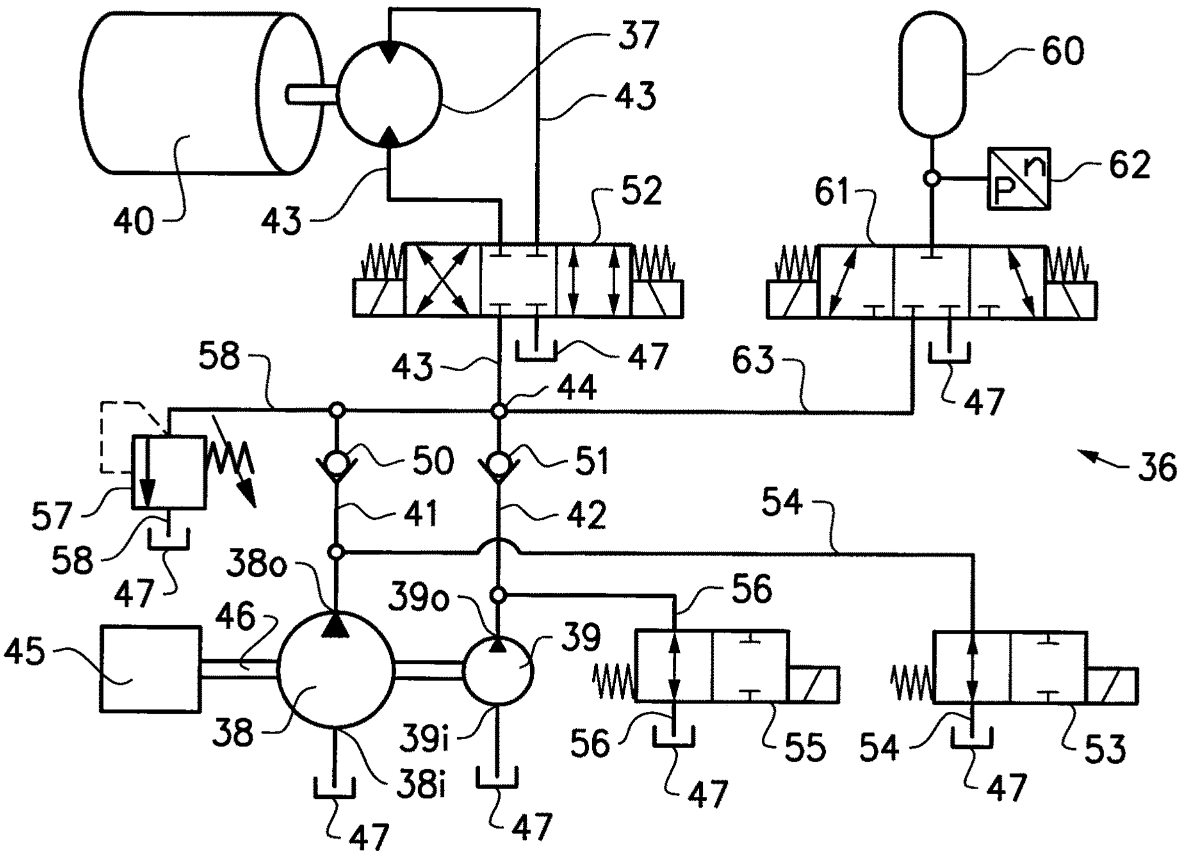
FIG. 6 shows a second embodiment of the disclosure.

FIG. 6 shows a second embodiment of the hydraulic system 36, which additionally comprises a hydraulic accumulator 60 fluidly connected to the outlet ports 38*o*, 39*o* of the first and second pumps 38, 39, as well as the hydraulic motor 37. The accumulator 60 is connected to the common feed path 43. The accumulator 60 is fluidly connected and charged by the hydraulic motor 37 via an accumulator control valve 61 during an eccentric deceleration phase. A pressure switch or pressure sensor 62 may be provided in the feed path 63 for the purpose of detecting the accumulator charge status. In the next acceleration phase the accumulator is fluidly connected to hydraulic motor 37 and discharged during the acceleration phase. Only the energy loss associated with charging and discharging the accumulator must be supplementary supplied from a hydraulic pump for accelerating the eccentric 30 back to nominal speed. Since the energy loss associated with charging and discharging the accumulator normally is relatively small, the power output from the power source for accelerating the eccentric 30 is nearly eliminated. Consequently, the hydraulic accumulator 60 enables a further reduction or a complete elimination of energy dissipation at the pressure relief valve 57, depending on the setting of the pressure relief valve 57, all without the need using a variable displacement pump.

It is desirable to enable downsizing of the power source 45 without reduction in eccentric acceleration time. Downsizing is normally not possible when the accumulator 60 first is used for accelerating the eccentric 30 to a speed of maybe 95% of the nominal speed, and one or both of the first and second pumps 38, 39 subsequently are used during a short time period for accelerating, the eccentric 30 up to the nominal speed, because the pumps 38, 39 must supply pressurised fluid at high pressure and high flow for said short time period. Consequently, engine full power is still needed for said short time period, thereby eliminating the possibility of downsizing the power source. The hydraulic system of FIG. 6 solves this problem by operating one of hydraulic pumps before and/or simultaneous to discharge of the accumulator, i.e. at times when less flow is required. Reduced level of required flow at constant pressure enables reduced level of power input. Consequently, the individual, more or less simultaneous or consecutive, operation of the first and second pumps enables together with the hydraulic accumulator use of a smaller combustion engine while still being able to quickly accelerate the eccentrics up to nominal speed. However, even further advantages are realised by having hydraulic pump with different displacement volumes. By providing a smaller displacement hydraulic pump and a larger displacement hydraulic pump and by operating the smaller displacement hydraulic pump before and/or simultaneously with discharge of pressurised hydraulic fluid from the accumulator, further reduction in engine peak power is possible, thereby enabling further downsizing of the combustion engine, and use of a less pressure resistant large displacement hydraulic pump.

As already mentioned, the additional flow required to accelerate the eccentric to nominal speed is however relatively small. This aspect may be further utilised by providing one of the first and second hydraulic pump with a larger displacement volume than the other of the first and second hydraulic pump. The smaller displacement hydraulic pump may be selected according to the expected energy loss level, such that the accumulator discharge flow and output flow from the smaller displacement hydraulic pump jointly is sufficient for accelerating the motor to the nominal speed. Preferably, the smaller of the first and second hydraulic pumps may have a displacement volume in the range of 10%-90% of the larger displacement pump, preferably in the range of 20%-70%, and more preferably in the range of 25%-50%. Using a smaller displacement pump for accelerating the eccentric enables even further reduced engine size because the required power is proportional to the displacement volume. Furthermore, the smaller hydraulic pump may also be designed to withstand a higher operating, pressure than the larger displacement pumps, thereby enabling manufacturing of the larger displacement pump in less durable, lighter and less costly material, such as aluminium. Typically, the smaller displacement pump is used for accelerating the eccentric to the nominal speed and the larger displacement pump is merely operated in the steady-state mode, where the feed pressure is much lower. At steady-state operation no fluid passes the relief valve 57. If the displacement volume of the large displacement pump is large enough to drive the motor at the nominal speed alone the smaller displacement pump may be additionally used for varying the frequency of the eccentric. Operation of the large displacement pump alone provides a first frequency and the simultaneous operation of both the large and small displacement pump provides a second, higher frequency.

Figure 7:
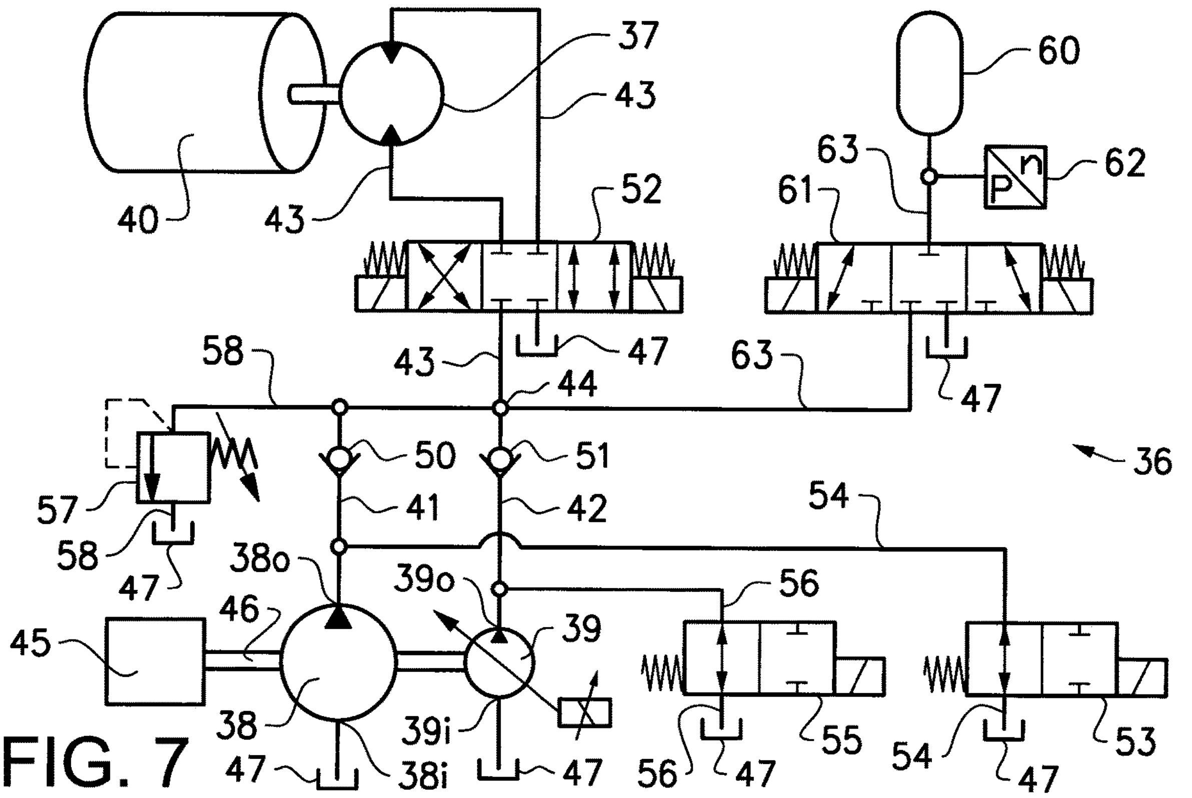
FIG. 7 shows a third embodiment of the disclosure.

With reference to FIG. 7 which shows a third embodiment of the hydraulic system 36, variation in eccentric operating frequency can alternatively be arranged by providing one 39 of the first and second hydraulic, pumps 38, 39 is a variable displacement pump and the other 38 of the first and second hydraulic pumps 38, 39 is a fixed displacement pump. Preferably, the smaller displacement pump 39 is the variable displacement pump because of the lower costs of a small variable displacement pump compared with a large variable displacement pump. The variable displacement pump 39 is preferably a continuously variable displacement pump that is capable of providing any flow level between a min and max flow level. Consequently, the range of possible eccentric, frequency is significantly increased compared with the solution having two fixed displacement pumps as shown in FIG. 6.

For each of the embodiments 1-3 described above both the first and second feed paths 41 42 are free from any additional hydraulic motor. The first and second feed paths 41, 42 are thus free from any hydraulic motor. Furthermore, the motor directional control valve 52 is provided in the common feed path 43 between coupling point 44 and the motor 37.

Figure 8:
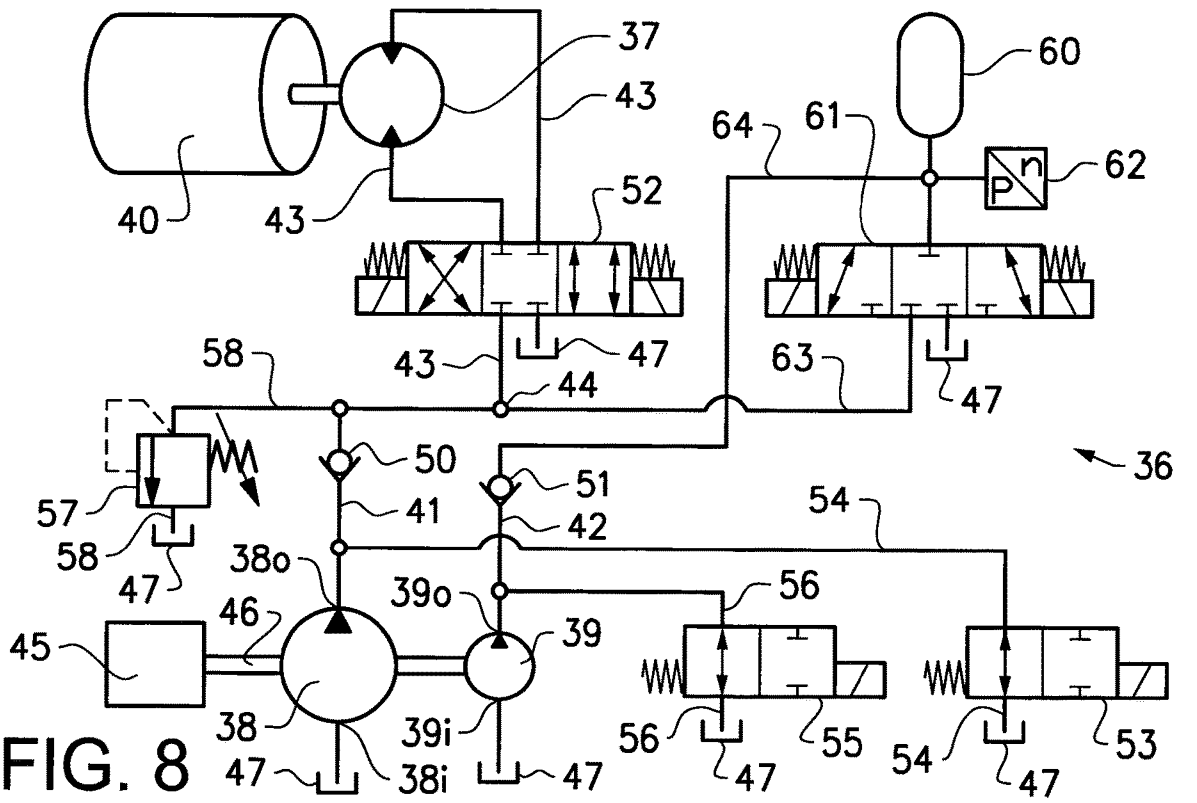
FIG. 8 shows a fourth embodiment of the disclosure.

With reference to FIG. 8 which shows a fourth embodiment of the hydraulic system 36, an accumulator feed path 64 is provided between the outlet port 390 of the second displacement pump 39 and the inlet of the accumulator 60. The accumulator feed path 64 is not connected to the common feed path 43 as in the second and third embodiment. The outlet port 39*o* of the second pump 39 is consequently not connected to the motor control valve or the motor Preferably, the second displacement pump 39 exhibits a smaller displacement volume than the first pump 38. Both pumps 38, 39 are here illustrated as fixed displacement pumps but one of the pumps, the first 38 or the second 39 may be a variable displacement pump. The smaller displacement second pump 39 can be used to charge the accumulator 60 independent of the operation mode of the eccentric during the complete compaction cycle. This design consequently extends the potential time for charging of the hydraulic accumulator, thereby enabling in further reduction is required displacement size for the second pump 39.

For each of the embodiments 1-4 described, above both the motor directional control valve 52 is arranged to control the flow from the first hydraulic pump 38 to the hydraulic motor 37 and/or from the second hydraulic pump 39 to the hydraulic motor 37.

Figure 9:
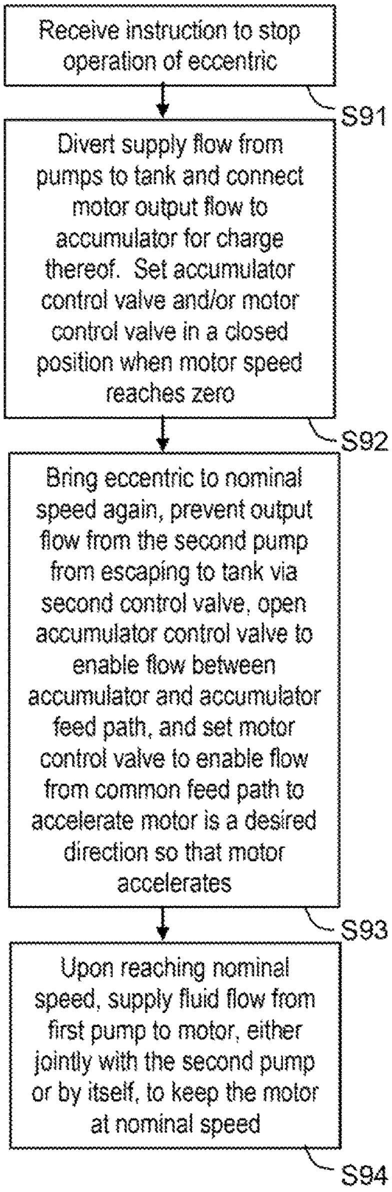
FIG. 9 shows a flow chart illustrating a first variant of operation of the hydraulic system according to the disclosure.

A few preferred examples of operation of the hydraulic system according to embodiments 2 and 3 during a typical deceleration phase and a subsequent acceleration phase of an eccentric of a compaction machine will be described below with reference to the flow charts of FIGS. 9-11. The first pump 38 is larger fixed displacement pump and the second pump 39 is a smaller fixed displacement pump, The flow chart of FIG. 9 schematically illustrates a first variant where the eccentric is in operation and fluid is supplied from one or both of the first and second pumps 38, 39. First step S91 of the flow chart involves receiving an instruction to stop operation of the eccentric. As a result, in step S92 the supply flow from the pumps 38, 39 is diverted to the tank 47 and the motor output flow is connected to accumulator for charge thereof. The accumulator control valve and/or the motor control valve are set in a closed position when the motor speed reaches zero. Upon receiving an instruction in step S93 to bring the eccentric to nominal speed again, output flow from the second pump 39 is prevented from escaping to the tank via the second control valve 55, the accumulator control valve 61 is opened to enable flow between the accumulator 60 and accumulator feed path 63 and motor control valve is set to enable flow from the common feed path 43 to accelerate the motor is a desired direction. As a result, the motor is accelerating. Upon reaching the nominal speed, fluid flow from the first pump is supplied to the motor at step S94, either jointly with the second pump 39 or by itself, to keep the motor at nominal speed. Acceleration was consequently realised by operation of a smaller displacement motor thereby enabling use of less output power of the power source 45.

The components can be dimensioned in a way that the accumulator 60, during a first phase of the acceleration, will consume part of the flow from the second pump 39 such that relief valve losses are reduced or completely eliminated. During a second phase of the acceleration, once the motor speed has increased further, additional flow to the motor 37 will come from the accumulator 60. In the first variant described both the accumulator 60 and second primp 39 were controlled to supply pressurised fluid to the motor 37 more or less simultaneously. However, according to a second, less advantageous variant, the second pump 39 may alternatively be controlled to be the single source of pressurised fluid during a first acceleration phase and the accumulator 60 may be controlled to be the single source of pressurised fluid during a second acceleration phase. This control strategy will however result in losses because a gradually reduced part of the supplied flow from the second motor 39 will then inevitable be dissipated back to the tank 47 via the relief valve 57.

Figure 10:
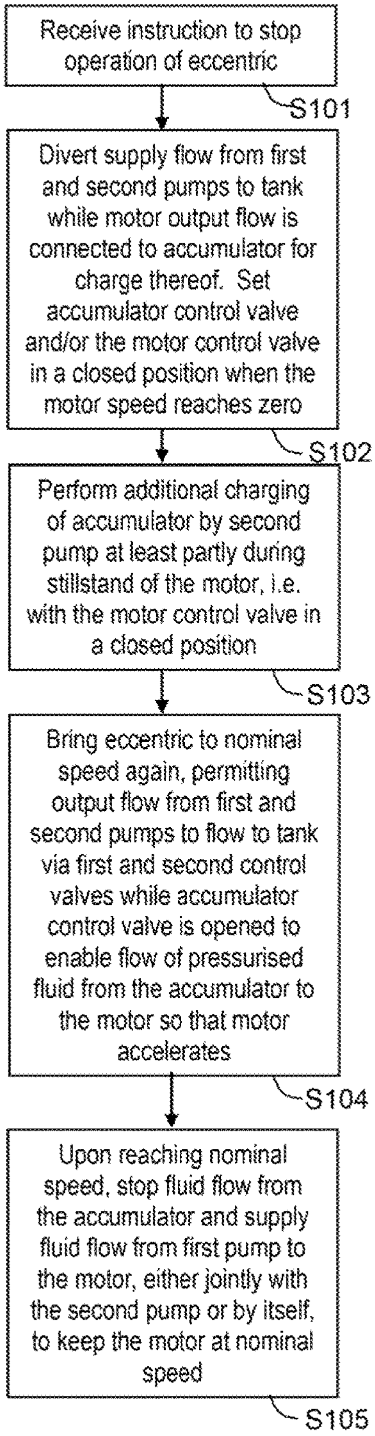
FIG. 10 shows a flow chart illustrating a third variant of operation of the hydraulic system according to the disclosure.

The flow chart of FIG. 10 schematically illustrates a third variant where the eccentric is in operation and fluid is supplied from one or both of the first and second pumps 38, 39. First step S101 of the flow chart involves receiving, an instruction to stop operation of the eccentric. As a result in step S102 the supply flow from the first and second pumps 38, 39 is diverted to the tank 47 while motor output flow is connected to accumulator for charge thereof. The accumulator control valve and/or the motor control valve are set in a closed position when the motor speed reaches zero. In this variant, additional charging of the accumulator by means of the second pump 39 is performed at least partly in step S103 during stillstand of the motor, i.e. with the motor control valve in a closed position. As a result, the charge level of the accumulator 60 may consequently be increased above the charge level necessary for enabling acceleration of the eccentric to the nominal speed without need for pressurised fluid from any of the pumps 38, 29 during, the acceleration phase. Consequently, upon receiving an instruction in step S104 to bring the eccentric to nominal speed again, output flow from both the first and second pumps 38, 39 can flow to the tank via the first and second control valves 53, 55 respectively while the accumulator control valve 61 is opened to enable flow of pressurised fluid from the accumulator 60 to the motor 37. As a result, the motor is accelerating. Upon reaching the nominal speed at step S105 fluid flow from the accumulator is stopped and the flow from the first pump 38 is supplied to the motor 37, either jointly with the second pump 39 or by itself, to keep the motor at nominal speed. Acceleration was consequently realised without any significant power requirement of the power source 45. The additional power needed to accelerate the eccentric was instead inputted into the accumulator during the eccentric stillstand phase.

Figure 11:
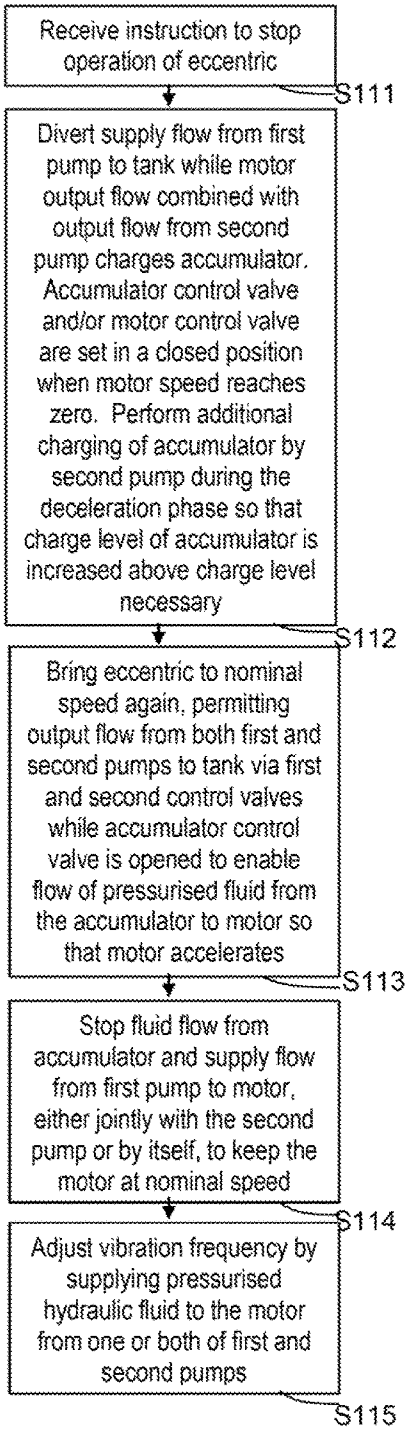
FIG. 11 shows a flow chart illustrating a fourth variant of operation of the hydraulic system according to the disclosure.

The flow chart of FIG. 11 schematically illustrates a fourth variant where the eccentric is in operation and fluid is supplied from one or both of the first and second pumps 38, 39. First step S111 of the flow chart involves receiving an instruction to stop operation of the eccentric. As a result, in step S112 the supply flow from the first pump 38 is diverted to the tank 47 while motor output flow combined with output flow from the second pump 39 charges the accumulator 60. The accumulator control valve and/or the motor control valve are set in a closed position when the motor speed reaches zero. In this variant, additional charging of the accumulator by means of the second pump 39 is consequently performed during the deceleration phase. As a result, the charge level of the accumulator 60 is increased above the charge level necessary for enabling acceleration of the eccentric to the nominal speed without need for pressurised fluid from any of the pumps 38, 29 during the acceleration phase. As a result, upon receiving an instruction in step S113 to bring the eccentric to nominal speed again, output flow from both the first and second pumps 38, 39 can flow to the tank via the first and second control valves 53, 55 respectively while the accumulator control valve 61 is opened to enable flow of pressurised fluid from the accumulator 60 to the motor 37. As a result, the motor is accelerating. Upon reaching the nominal speed at step S114 fluid flow from the accumulator is stopped and the flow from the first pump 38 is supplied to the motor 37, either jointly with the second pump 39 or by itself, to keep the motor at nominal speed. Acceleration was consequently realised without any significant power requirement of the power source 45. The additional power needed to accelerate the eccentric was instead inputted into the accumulator during the eccentric deceleration phase. This can be beneficial if the engine power is needed for other operations, for instance to reverse the driving direction of the compaction machine during eccentric stillstand phase. The vibration frequency of the vibratory mechanism (40) can be adjusted at step S115 by selectively supplying pressurised hydraulic fluid to the hydraulic motor (37) from one or both of the first and second hydraulic pumps (38, 39).

A combination of variants 2, 3 and 4 above may of course also be possible, where the second control valve 55 is set in a closed state at least partly during one or more of the eccentric deceleration, stillstand and acceleration phases. A likely operation mode for this kind of machines would be to combine these different operation variants for an optimized engine peak power reduction. During the phase where the eccentric speed is lower than the relevant flow from the used supply pump(s) there is a connection to the accumulator to be charged from this extra flow and any pressure relief losses are avoided. The accumulator charge time can be extended additionally charging the accumulator by means of the small pump from the beginning of the deceleration phase until the end of the acceleration phase, at which time point the large displacement first pump can be controlled to supply pressurised fluid to the motor and replacing the flow from the accumulator. By extending the charge time as long as possible, a smaller displacement pump can be used, thereby resulting in reduced engine power during operation of said pump.

Figure 12:
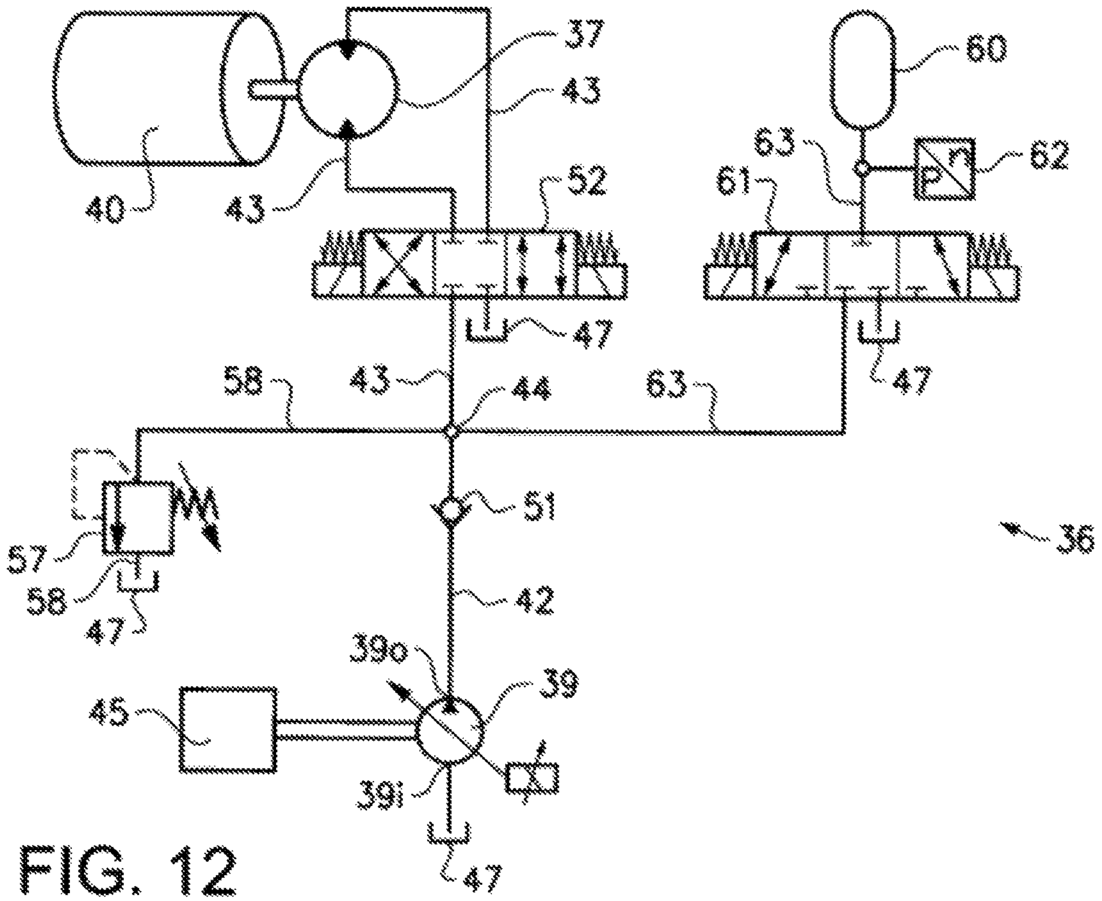
FIG. 12 shows a fifth embodiment of the disclosure.
Figure 12A:
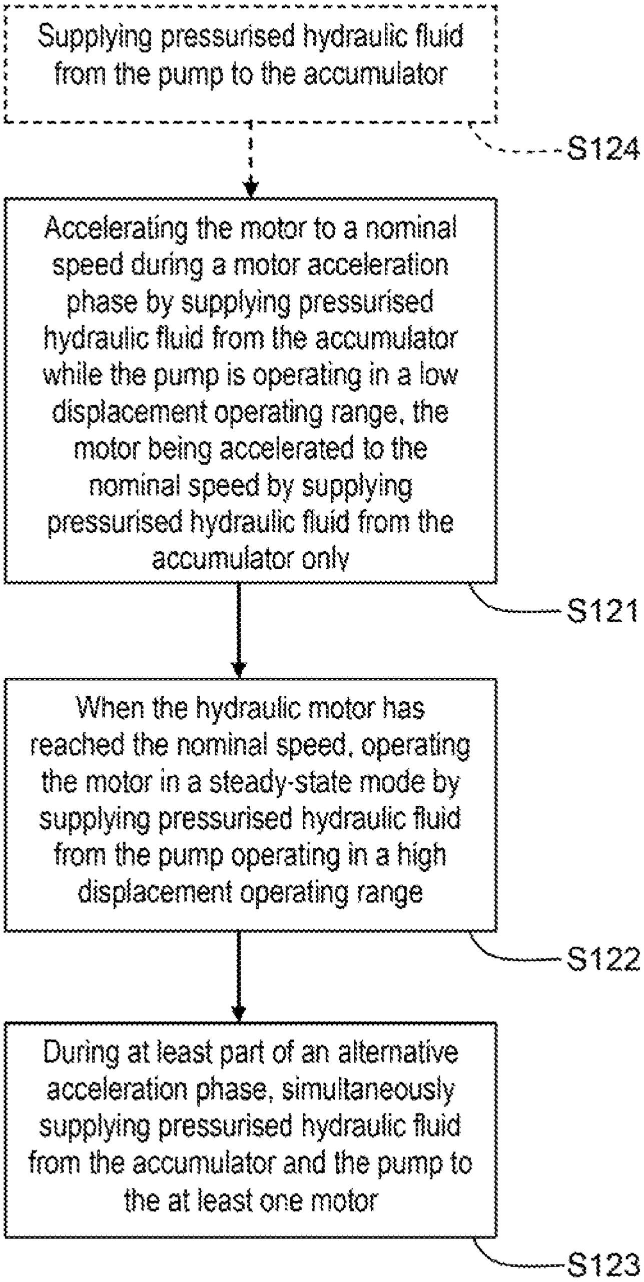
FIG. 12A shows a flow chart illustrating the operation of the hydraulic system according to the fifth embodiment the disclosure.

With reference to FIG. 12 a fifth embodiment of the hydraulic system 36 is disclosed. The hydraulic system is similar to the hydraulic system shown and described with reference to FIGS. 6-7 but with the difference that a single variable displacement hydraulic pump 39 is used instead of two hydraulic pumps. The hydraulic system 36 is configured to accelerate the hydraulic motor 37 to a nominal speed at step S121 (FIG. 12A) by supplying pressurised hydraulic fluid from the hydraulic accumulator 60 while the hydraulic pump 39 is operating in a low displacement operating range. Subsequently, when the hydraulic motor 37 has reached the nominal speed, the hydraulic system 36 is configured to operate the hydraulic motor in a steady-state mode by supplying pressurised hydraulic fluid from the pump 39 operating in a high displacement operating range at step S122 (FIG. 12A). By operating the variable displacement hydraulic motor 39 in a low displacement operating range during the acceleration phase of the motor 37, during which phase a relatively high feed pressure is required to quickly accelerate the motor 37, a reduced power output of the power source 45 is required because the required power output is proportional to the displacement volume. The low displacement operating range however does not deliver sufficient fluid flow to keep the motor 37 at the nominal speed.

Consequently, upon having reached the nominal speed without any or at least not excessive power losses over the pressure relief valve, the variable displacement pump 39 is simply controlled to operate in the high displacement operating range to provide sufficient flow to keep the motor 37 at the nominal speed. Similar to the disclosure with reference to FIGS. 6 and 7, the hydraulic system can be configured to either simultaneously supply pressurised hydraulic, fluid from the hydraulic accumulator 60 and the hydraulic pump 39 to the hydraulic motor 37 during at least a part of the hydraulic motor acceleration phase as seen at step S123 (FIG. 12A), or being configured to first supply pressurised hydraulic fluid from the hydraulic pump 39 to the hydraulic accumulator 60 as seen at step S124 (shown in phantom in FIG. 12A), and subsequently accelerate the hydraulic motor 37 to a nominal speed by supplying pressurised hydraulic fluid from the hydraulic accumulator 60 only.

Figure 13:
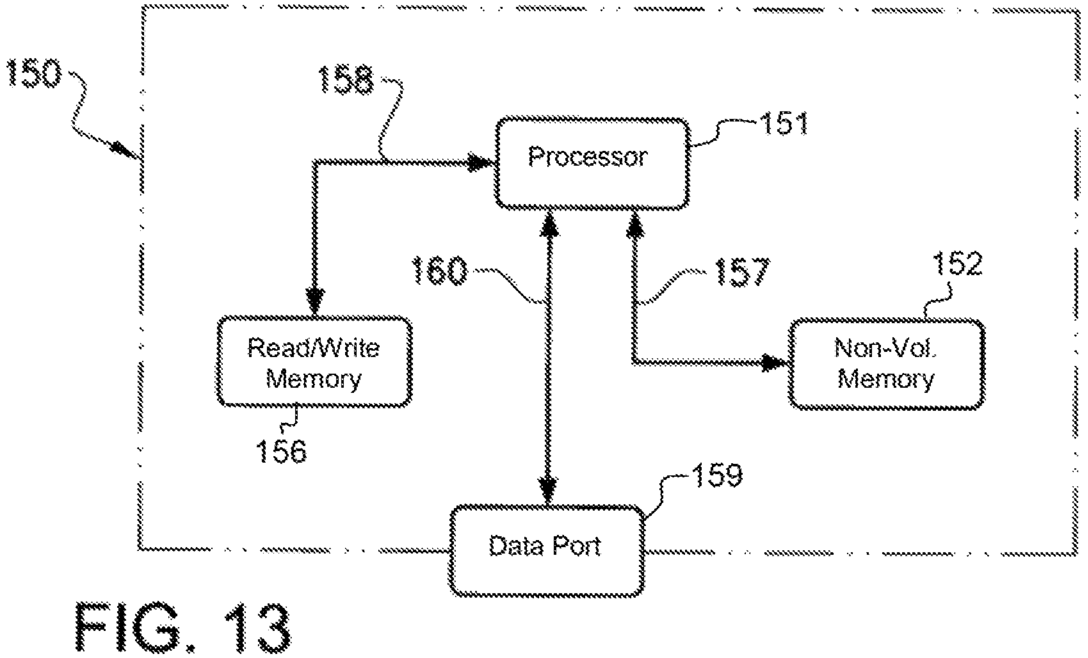
FIG. 13 shows an exemplary layout of a control unit according, to the disclosure.

The described methods for operating the hydraulic system are particularly suited to be controlled by a control unit or a computer. FIG. 13 schematically shows a layout of such a control unit. The disclosure relates to a computer program comprising program code means for performing the steps of the method described above when said program is run on a computer. The disclosure further relates to a computer readable medium carrying a computer program comprising program code means for performing the steps of the method described above when said program product is run on a computer. Finally, the disclosure relates to a control unit tier controlling a hydraulic, system, the control unit comprising a memory for storing program code means and a processor operable to run said program code means for performing all the steps of the method described above.

FIG. 13 shows a schematic layout of a control unit 150 according to the disclosure. The control unit 150 comprises a non-volatile memory 152, a processor 151 and a read and write memory 156. The memory 152 is arranged for storing a computer program for controlling the hydraulic system 150 is stored. The data-processing unit 151 can comprise, for example, a microcomputer. The program can be stored in an executable form or in a compressed state. The data-processing unit 151 is tailored for communication with the memory 152 through a data bus 157. In addition, the data-processing unit 151 is tailored for communication with the read and write memory 156 through a data bus 158. The data-processing unit 151 is also tailored for communication with a data port 159 by the use of a data bus 160. The method according to the present invention can be executed by the data processing unit 151 running the program stored in the memory 152.

The term "fluidly connected" used herein comprises not only the layout where two hydraulic components, such as a hydraulic pump, hydraulic motor or hydraulic accumulator, are directly connected via a flow path, such as a pipe, but also the layout where said two hydraulic components are connected via a valve member that can be controlled to enable a fluid flow in at least one direction between said two hydraulic components. The valve member may for example be a directional control valve or check valve Reference signs mentioned in the claims should not be seen as limiting the extent of the matter protected by the claims, and their sole function is to make claims easier to understand.

As will be realised, the disclosure is capable of modification in various obvious respects, all without departing from the scope of the appended claims. For example, the hydraulic system has been disclosed having a single hydraulic motor, but the disclosure also encompasses variants having two hydraulic motors being positioned in series. This arrangement may be advantageously implemented when the compaction machine comprises two compaction drums, each having an eccentric. Furthermore, the hydraulic, system may additionally be designed to also include a hydraulic drive motor for propulsion of the compaction machine. Accordingly, the drawings and the description thereto are to be regarded as illustrative in nature, and not restrictive.

The invention claimed is:

1. Hydraulic system for driving a vibratory mechanism of a compaction roller, the hydraulic system comprising:
- at least one hydraulic motor connectable to the vibratory mechanism,
- a first hydraulic pump fluidly connected to the at least one hydraulic motor and arranged for supplying pressurised hydraulic fluid to the at least one hydraulic motor,
- a second hydraulic pump fluidly connected to the at least one hydraulic motor and arranged for supplying pressurised hydraulic fluid to the at least one hydraulic motor, and
- a hydraulic accumulator fluidly connected to the at least one hydraulic motor,
- wherein the hydraulic system is configured to first supply pressurised hydraulic fluid from one of the first and second hydraulic pumps to the hydraulic accumulator, and to subsequently accelerate the hydraulic motor to a nominal speed during a hydraulic motor acceleration phase by supplying pressurised hydraulic fluid from the hydraulic accumulator only and, when the hydraulic motor has reached the nominal speed, operate the hydraulic motor in a steady-state mode by supplying pressurised hydraulic fluid from at least the other of the first and second hydraulic pumps to the hydraulic motor.

2. Hydraulic system according to claim 1, wherein the first and second hydraulic pumps has the same displacement volume, or one of the first and second hydraulic pumps has a larger maximal displacement volume than the other of the first and second hydraulic pumps.

3. Hydraulic system according to claim 2, wherein the smaller displacement pump of the first and second hydraulic pumps has a displacement volume in the range of 10% - 90% of the larger displacement pump.

4. Hydraulic system according to claim 1, wherein one of the first and second hydraulic pumps is designed to withstand a higher operating pressure than the other of the first and second hydraulic pumps.

5. Hydraulic system according to claim 1, wherein one of the first and second hydraulic pumps is a variable displacement pump and the other of the first and second hydraulic pumps is a fixed displacement pump.

6. Hydraulic system according to claim 1, wherein the hydraulic system is configured to feed pressurised hydraulic fluid from the at least one hydraulic motor to the hydraulic accumulator during a hydraulic motor deceleration phase.

7. Hydraulic system according to claim 1, wherein the first hydraulic pump is fluidly connected to the at least one hydraulic motor via a first feed path, the second hydraulic pump is fluidly connected to the at least one hydraulic motor via a second feed path, and both the first and second feed paths are free from any additional hydraulic motor.

8. Hydraulic system according to claim 1, wherein the first and second hydraulic pumps are fluidly connected to the at least one hydraulic motor partly via a common feed path and partly via individual feed paths, the individual feed paths meet and merge to the common feed path at a coupling point, and at least one hydraulic flow control component is provided in the common feed path.

9. Hydraulic system according to claim 1, wherein at least one valve is arranged to control the flow from the first hydraulic pump to the at least one hydraulic motor and/or from the second hydraulic pump to the at least one hydraulic motor.

10. Compaction machine comprising a hydraulic system, the hydraulic system comprising
- at least one hydraulic motor connectable to vibratory mechanism,
- a first hydraulic pump fluidly connected to the at least one hydraulic motor and arranged for supplying pressurised hydraulic fluid to the at least one hydraulic motor,
- a second hydraulic pump fluidly connected to the at least one hydraulic motor and arranged for supplying pressurised hydraulic fluid to the at least one hydraulic motor, and
- a hydraulic accumulator fluidly connected to the at least one hydraulic motor,
- wherein the hydraulic system is configured to first supply pressurised hydraulic fluid from one of the first and second hydraulic pumps to the hydraulic accumulator, and to subsequently accelerate the hydraulic motor to a nominal speed by supplying pressurised hydraulic fluid from the hydraulic accumulator only, and
- when the hydraulic motor has reached the nominal speed, operate the hydraulic motor in a steady-state mode by supplying pressurised hydraulic fluid from at least the other of the first and second hydraulic pumps to the hydraulic motor.

11. Method for controlling a vibratory mechanism of a compaction roller, wherein the vibratory mechanism is mechanically connected to at least one hydraulic motor arranged to be supplied with pressurised hydraulic fluid from a first and a second hydraulic pump, the method comprising:
- supplying pressurised hydraulic fluid from one of the first and second hydraulic pumps to the hydraulic accumulator,
- subsequently accelerating the hydraulic motor to a nominal speed during a hydraulic motor acceleration phase by supplying pressurised hydraulic fluid from the hydraulic accumulator only, and
- when the hydraulic motor has reached the nominal speed, operating the hydraulic motor in a steady-state mode by supplying pressurised hydraulic fluid from at least the other of the first and second hydraulic pumps to the hydraulic motor.

12. Method according to claim 11, comprising:
- supplying pressurised hydraulic fluid from the at least one hydraulic motor to a hydraulic accumulator during a hydraulic motor deceleration phase.

13. Method according to claim 11, comprising adjusting the vibration frequency of the vibratory mechanism by selectively supplying pressurised hydraulic fluid to the hydraulic motor from one or both of the first and second hydraulic pumps.

14. A computer comprising a program for performing the steps of the method according to claim 11 by controlling the hydraulic motor, the first and second hydraulic pumps, and the accumulator when program is run on the computer.

15. A non-transitory computer readable medium carrying a computer program for performing the steps of the method according to claim 11 by controlling the hydraulic motor, the first and second hydraulic pumps, and the accumulator when program product is run on a computer.

16. A control unit for controlling a hydraulic system, the control unit being configured to perform the steps of the method according to claim 11 by controlling the hydraulic motor, the first and second hydraulic pumps, and the accumulator.

* * * * *